US012776072B2

(12) United States Patent
Nam et al.

(10) Patent No.: US 12,776,072 B2
(45) Date of Patent: Oct. 27, 2026

(54) METHOD AND APPARATUS FOR ENCODING DISAPLACEMENT VIDEO USING IMAGE TILING

(71) Applicant: Electronics and Telecommunications Research Institute, Daejeon (KR)

(72) Inventors: Da Yun Nam, Daejeon (KR); Hyun Cheol Kim, Daejeon (KR); Jeong Il Seo, Daejeon (KR); Seong Yong Lim, Daejeon (KR); Chae Eun Rhee, Seoul (KR); Gwang Cheol Ryu, Gwangju (KR); Yong Wook Seo, Seoul (KR); Hyun Min Jung, Gunpo-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 87 days.

(21) Appl. No.: 18/489,359

(22) Filed: Oct. 18, 2023

(65) Prior Publication Data

US 2024/0135595 A1 Apr. 25, 2024
US 2024/0233193 A9 Jul. 11, 2024

(30) Foreign Application Priority Data

Oct. 21, 2022 (KR) ........................ 10-2022-0136735
Sep. 26, 2023 (KR) ........................ 10-2023-0129469

(51) Int. Cl.
*G06T 9/00* (2006.01)
*G06T 19/00* (2011.01)

(52) U.S. Cl.
CPC .............. *G06T 9/001* (2013.01); *G06T 19/00* (2013.01); *G06T 2210/32* (2013.01); *G06T 2210/36* (2013.01)

(58) Field of Classification Search
None
See application file for complete search history.

(56) References Cited

U.S. PATENT DOCUMENTS 9,420,310 B2 8/2016 Tian et al.
11,538,195 B2 * 12/2022 Mao .......................... G06T 3/40
(Continued)

FOREIGN PATENT DOCUMENTS

KR 10-1221874 B1 1/2013
KR 10-2250440 B1 5/2021

OTHER PUBLICATIONS

Huang, Chao et al., "[V-DMC] [EE4.7] report," International Organisation for Standardisation Organisation Internationale De Normalisation ISO/IEC JTC 1/SC 29/WG 7 Coding of Moving Pictures and Audio, Oct. 2022, (6 Pages in English).

*Primary Examiner* — Saptarshi Mazumder
(74) *Attorney, Agent, or Firm* — NSIP Law

(57) ABSTRACT

The present invention relates to a method and apparatus for encoding a displacement video using image tiling. A method for encoding multi-dimensional data according to an embodiment of the present disclosure may comprise: converting the multi-dimensional data into one or more frames with two-dimensional characteristics; generating one or more frame groups by grouping the one or more frames with pre-configured number units; reconstructing frames belonging to each frame group into a tiled frame; and generating a bitstream by encoding the tiled frame. Here, the tiled frame may be constructed with one or more blocks, and each block may be constructed by rearranging pixels existing at the same location in the frames.

20 Claims, 15 Drawing Sheets

(56) References Cited

U.S. PATENT DOCUMENTS

| | | | | |
|---|---|---|---|---|
| 2002/0067356 | A1* | 6/2002 | Sudo | H04N 13/31<br>348/E13.058 |
| 2010/0231599 | A1* | 9/2010 | Tung | G06T 11/40<br>345/522 |
| 2019/0158830 | A1* | 5/2019 | Carmel | H04N 19/593 |
| 2021/0409768 | A1* | 12/2021 | Joshi | H04N 19/174 |
| 2022/0353513 | A1* | 11/2022 | Bultje | H04N 19/119 |

* cited by examiner

METHOD AND APPARATUS FOR ENCODING DISAPLACEMENT VIDEO USING IMAGE TILING

CROSS-REFERENCE TO RELATED APPLICATIONS

This application claims the benefit of earlier filing date and right of priority to Korean Application No. 10-2022-0136735, filed on Oct. 21, 2022 and Korean Application No. 10-2023-0129469, filed on Sep. 26, 2023, the contents of which are all hereby incorporated by reference herein in their entirety.

TECHNICAL FIELD

The present disclosure relates to method and apparatus for encoding a displacement video using an image tiling.

BACKGROUND

Some standards being established for the purpose of immersive media compression have a structure that converts 3-dimensional (3D) data into 2-dimensional (2D) video and compresses it using existing video codecs.

As a specific example, the Video-based Point Cloud Compression (V-PCC) standard corresponds to a compression standard for dynamic point cloud data and it has the technical feature of converting geometric information and attribute information into two-dimensional video and encoding it using existing video codecs such as high efficiency video coding (HEVC) and versatile video coding (VVC).

The MPEG immersive video (MIV) standard is being standardized targeting preprocessing scheme/post-processing scheme/metadata for compressing, transmitting, and reproducing multi-view texture and depth map images.

The Video-based dynamic mesh coding (V-DMC) standard corresponds to a compression standard for dynamic mesh data, and it has technical features of converting attribute information and displacement information of geometric information into two-dimensional video and encoding it using existing video codecs such as HEVC and VVC.

SUMMARY

The technical object of the present disclosure is to provide a method and apparatus for encoding a displacement video using an image tiling.

The technical object of the present disclosure is to provide a method and apparatus for performing image tiling to merge and reconstruct one or more frames into one tiled frame to have appropriate resolution and high spatial correlation.

The technical object of the present disclosure is to provide a method and apparatus for merging a group of frames converted from an N-dimension (ND) domain to a two-dimensional (2D) domain into one tiled frame through an image tiling scheme.

The technical object of the present disclosure is to provide a method and apparatus for adaptively determining a packing order when merging a plurality of pixels into one block during an image tiling.

The technical object of the present disclosure is to provide a method and apparatus for adaptively determining the size or width/height ratio of a block when merging a plurality of pixels into one block during an image tiling.

The technical objects to be achieved by the present disclosure are not limited to the above-described technical objects, and other technical objects which are not described herein will be clearly understood by those skilled in the pertinent art from the following description.

A method for encoding multi-dimensional data according to an aspect of the present disclosure may comprise: converting the multi-dimensional data into one or more frames with two-dimensional characteristics; generating one or more frame groups by grouping the one or more frames with pre-configured number units; reconstructing frames belonging to each frame group into a tiled frame; and generating a bitstream by encoding the tiled frame. Here, the tiled frame may be constructed with one or more blocks, and each block may be constructed by rearranging pixels existing at the same location in the frames.

A method for decoding a bitstream according to an additional aspect of the present disclosure, the method comprising: generating a tiled frame with two-dimensional characteristics by decoding the bitstream; restoring one or more frames belonging to a frame group from the tiled frame; and converting the one or more of frames into a multi-dimensional data. Here, the tiled frame may be constructed with one or more blocks, and each block may be constructed by rearranging pixels existing at the same location in the plurality of frames.

As one or more non-transitory computer readable medium storing one or more instructions according to an additional aspect of the present disclosure, the one or more instructions are executed by one or more processors and control an apparatus for encoding multi-dimensional data to: convert the multi-dimensional data into a one or more frames with two-dimensional characteristics; generate one or more frame groups by grouping the one or more of frames with pre-configured number units; reconstruct frames belonging to each frame group into a tiled frame; and generate a bitstream by encoding the tiled frame. Here, the tiled frame may be constructed with one or more blocks, and each block may be constructed by rearranging pixels existing at the same location in the frames.

In various aspects of the present disclosure, a rearrangement order of the pixels may be determined based on at least one of characteristics of the multi-dimensional data or characteristics of a codec for the encoding. In this regard, the rearrangement order of the pixels may be applied equally to the one or more blocks, or may be applied differently for each block, based on a specific criterion.

In addition, in various aspects of the present disclosure, a width and height lengths of each of the one or more blocks may be determined based on at least one of characteristics of the multi-dimensional data or characteristics of a codec for the encoding. In this regard, the width and height lengths of each of the one or more blocks may be related to a resolution of the tiled frame.

In addition, in various aspects of the present disclosure, the frames may correspond to neighboring frames during a certain period in display order or decoding order.

In addition, in various aspects of the present disclosure, a resolution of the tiled frame may be set higher than or equal to a resolution of each of the one or more frames.

In addition, in various aspects of the present disclosure, the method may further comprise determining whether to perform reconstruction of the tiled frame, based on at least one of information on a multi-dimensional domain, information on conversion to a two-dimensional domain, or content information.

In addition, in various aspects of the present disclosure, the method may further comprise storing or transmitting information on the frame group and information on the one or more blocks. Here, the information on the plurality of blocks may include information on the rearrangement order of the pixels, information on the width and height lengths of each of the one or more blocks.

According to the present disclosure, a method and apparatus for encoding a displacement video using an image tiling may be provided.

According to the present disclosure, a method and apparatus for performing image tiling to merge and reconstruct one or more frames into one tiled frame to have appropriate resolution and high spatial correlation may be provided.

According to the present disclosure, a method and apparatus for merging a group of frames converted from an N-dimension (ND) domain to a two-dimensional (2D) domain into one tiled frame through an image tiling scheme may be provided.

According to the present disclosure, a method and apparatus for adaptively determining a packing order when merging a plurality of pixels into one block during an image tiling may be provided.

According to the present disclosure, a method and apparatus for adaptively determining the size or width/height ratio of a block when merging a plurality of pixels into one block during an image tiling may be provided.

Effects achievable by the present disclosure are not limited to the above-described effects, and other effects which are not described herein may be clearly understood by those skilled in the pertinent art from the following description.

DETAILED DESCRIPTION

Figure 1:
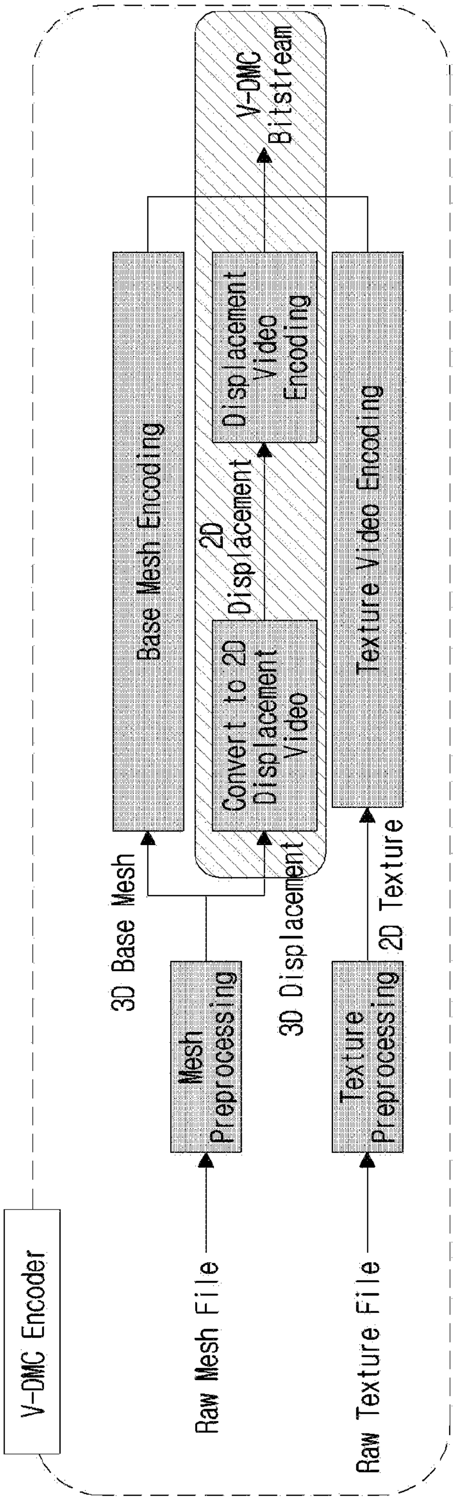
FIG. 1 illustrates encoder operation in the video-based dynamic mesh coding (V-DMC) standard.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

For some standards being established for the purpose of immersive media compression (e.g., V-PCC, MIV, V-DMC), 3D data may be converted to 2D data, and the converted 2D data may be encoded as a bitsream using an existing 2D compressed video codec.

FIG. 1 illustrates encoder operation in the video-based dynamic mesh coding (V-DMC) standard.

The V-DMC standard is related to compression and transmission scheme for dynamic mesh content in which at least one of the components of mesh data changes on the time axis. Here, the components of mesh data may include geometry information, vertex attribute information, attribute map, mapping information, connectivity information, or the like.

Referring to FIG. 1, in the V-DMC model, mesh data may be separated into base mesh information and displacement information.

In this regard, 'displacement' means 'N-dimensional geometric information signal or residual signal of geometric information'. Here, N is a positive integer greater than or equal to 1.

Additionally, the base mesh is compressed using an existing mesh codec (e.g., Draco, etc.) and the displacement information and texture information may be encoded using existing video codecs (e.g., HEVC, VVC, etc.).

In this regard, in the process of encoding displacement information in V-DMC, the 3D displacement field may be converted into 2D displacement video, and the converted 2D displacement video may be compressed using an existing 2D video codec.

In this regard, like the displacement video of V-DMC described above, 2D data converted from 3D data is often encoded using an existing video codec, but 2D data converted in this way may have difficulty experiencing the optimal encoding performance of existing video codecs.

For example, in displacement coding of V-DMC, displacement information of mesh data may be converted to 2D video, and the converted 2D video may be compressed using a video codec. That is, for displacement coding of V-DMC, the 3D displacement field may be converted to 2D displacement video.

At this time, most pixel values of the V-DMC displacement video are very close to the median value (e.g., 512 for 10 bits), but the correlation between neighboring pixels and the correlation between neighboring frames are poor. Additionally, a displacement frame with very small resolution may be generated for each frame (e.g., the horizontal width of the resolution is fixed to 256).

However, the latest video codecs (e.g., HEVC, VVC, etc.) are being standardized targeting high-resolution video compression. Therefore, displacement video as described above has data characteristics that are not appropriate for existing video codecs.

Considering this, in order to improve the coding efficiency of the 2D codec, the displacement video needs to be reconstructed to increase spatial correlation at higher resolution. Through this, the compression performance of existing video encoders may be improved.

In order to solve the problems described above, the present disclosure proposes a method of converting 3D data into 2D data and then reconstructing it into 2D data with spatial resolution and high spatial correlation appropriate for the latest video codec.

The method proposed in the present disclosure is described as a representative example of a method of converting 3D data to 2D data and then reconstructing it, but the method proposed in the present disclosure is not limited thereto and may also be expanded and applied for N-dimensional (where N is a positive integer greater than or equal to 1) data.

Hereinafter, the present disclosure proposes an image filing method for merging and reconstructing a plurality of frames into one frame with appropriate resolution and high spatial correlation.

Figure 2:
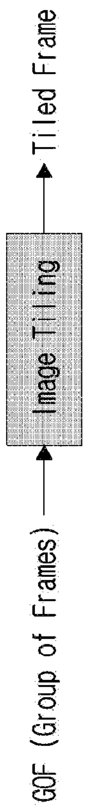
FIG. 2 illustrates image tiling according to an embodiment of the present disclosure.

FIG. 2 illustrates image tiling according to an embodiment of the present disclosure.

Referring to FIG. 2, a tiled frame may be generated by performing image tiling on a group of frames (GOF).

Here, a frame refers to 2D data corresponding to one view/viewpoint in the display or decoding order.

Additionally, GOF refers to a 2D data group that groups neighboring 2D frames for a certain period in display or decoding order.

Additionally, a tiled frame refers to a frame reconstructed from GOF through image tiling.

Specifically, when there are two or more frames constituting a GOF, that is, when there are a plurality of frames, low-resolution frames may be reconstructed into one high-resolution tiled frame. On the other hand, when the GOF consists of one frame, the original frame is divided into a plurality of blocks, and the location and arrangement of samples constituting the frame may be reconstructed.

Here, a block refers to one segment when one 2D frame is divided into multiple segments (e.g., rectangular segments).

Figure 3A:
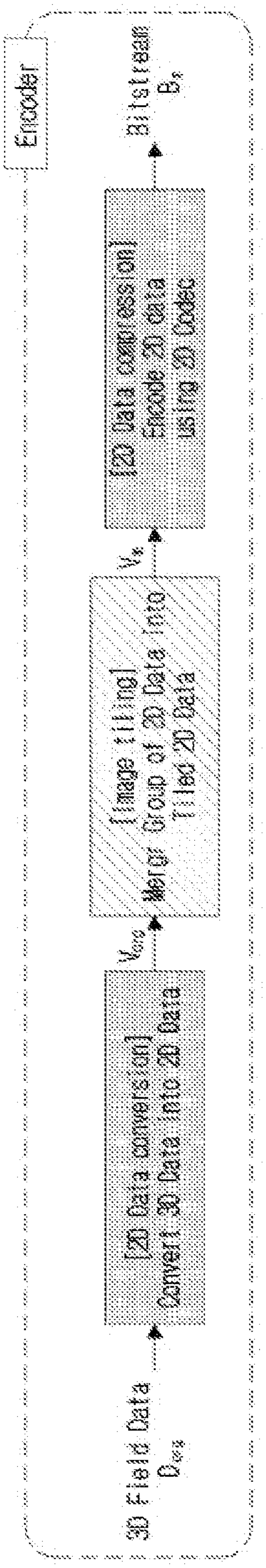
FIGS. 3A and 3B illustrate an encoding process and a decoding process based on image tiling according to an embodiment of the present disclosure.
Figure 3B:
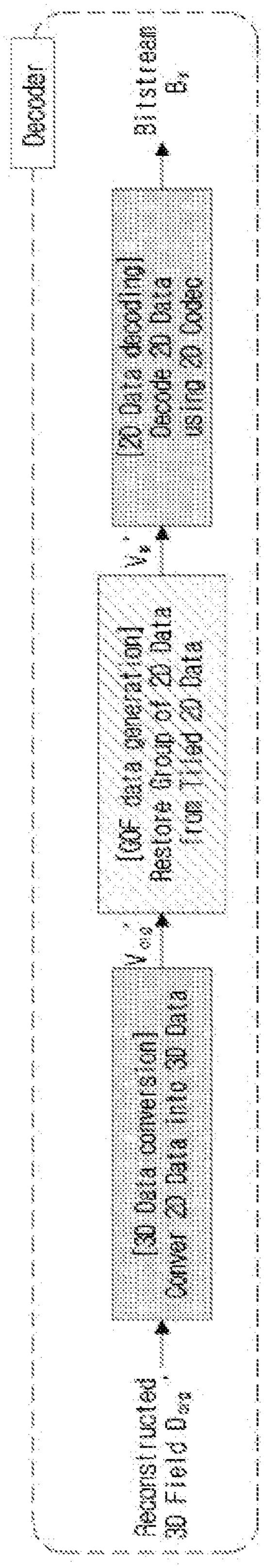

FIGS. 3A and 3B illustrate an encoding process and a decoding process based on image tiling according to an embodiment of the present disclosure.

FIG. 3A illustrates the encoding process of converting 3D field data ($D_{org}$) into a bitstream ($B_m$) based on image tiling.

For example, an encoder may convert 3D field data into 2D data ($V_{org}$).

Afterwards, the encoder may perform image tiling to merge a 2D data group (e.g., GOF) into one tiled 2D data ($V_m$) (e.g., tiled frame).

Afterwards, the encoder may perform 2D data encoding on the tiled 2D data using a 2D video codec.

Through this process, a bitstream ($B_m$) may be generated from 3D field data ($D_{org}$).

FIG. 3B illustrates a decoding process of converting a bitstream ($B_m$) into 3D field data ($D_{org}$) based on image tiling.

For example, a decoder may perform 2D data decoding for a bitstream using a 2D video codec. Through this, tiled 2D data ($V_m'$) may be generated.

Afterwards, the decoder may restore a 2D data group (e.g., GOF) from the tiled 2D data. Through this, 2D data ($V_{org}$) may be generated/restored.

Afterwards, the decoder may convert the generated/restored 2D data into 3D field data.

Through this process, 3D field data ($D_{org}$) reconstructed from the bitstream ($B_m$) may be generated.

Referring to the process in FIG. 3, while the existing encoding process applies a 2D data compression process immediately after performing 2D data conversion, the encoding process proposed in the present disclosure is different in that an image tiling process is added to reconstruct a group of frames (GOF) into tiled frames before the 2D data compression process.

Hereinafter, in relation to the above-described image tiling, 1) a method for merging a plurality of frames in GOF units, 2) a method for adaptively determining the block packing order, and 3) a method for adaptively determining the block width/height length are described through detailed examples.

First, the method for merging a plurality of frames in GOF units in the image tiling process will be described.

Figure 4:
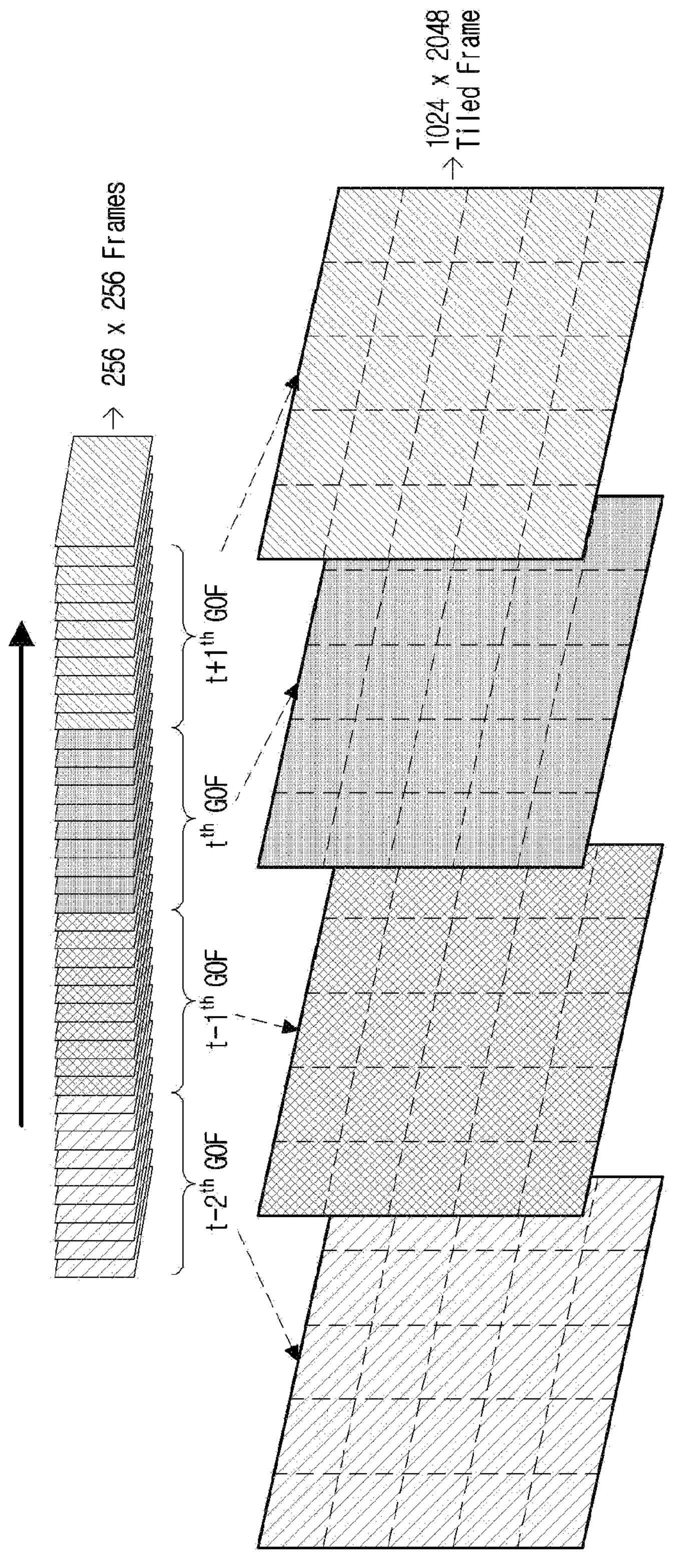
FIG. 4 illustrates merging of a plurality of frames in GOF units for image tiling according to an embodiment of the present disclosure.

FIG. 4 illustrates merging of a plurality of frames in GOF units for image tiling according to an embodiment of the present disclosure.

Referring to FIG. 4, for image tiling, neighboring frames may be merged and reconstructed into one frame.

Specifically, neighboring frames in display order and/or decoding order may be grouped/set in GOF units, and one GOF may be reconstructed into one tiled frame.

For example, if one GOF consists of 32 frames with a resolution of 256×256, one frame with a high resolution of 1024×2048 may be reconstructed by merging all frames belonging to the GOF.

In this regard, a GOF may consist of one or more frames. For example, the resolution of tiled frames (i.e., the number of frames constituting the GOF) may be determined by considering external factors such as 2D video codec characteristics and network environment.

Figure 5:
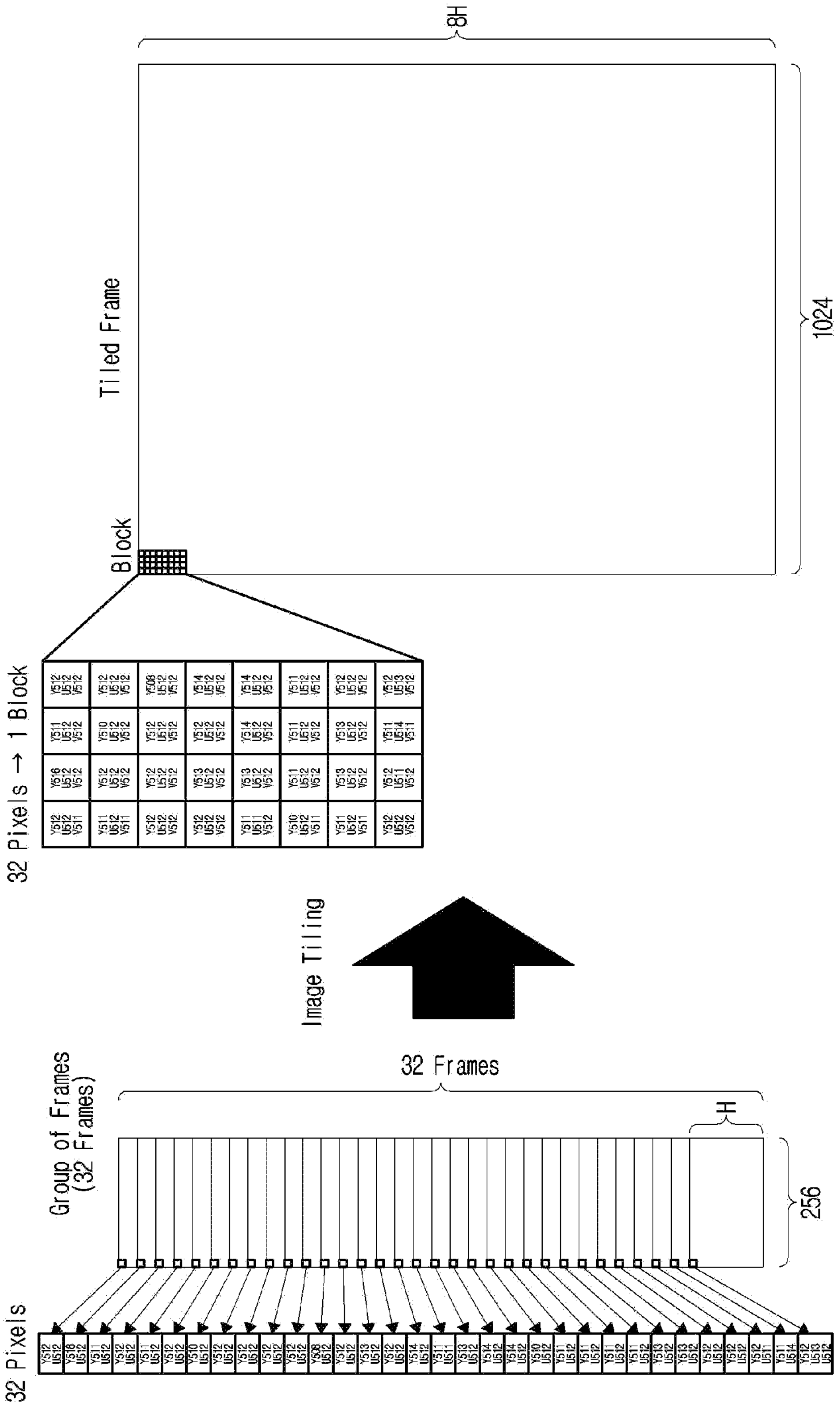
FIG. 5 illustrates block generation on a tiled frame according to an embodiment of the present disclosure.

FIG. 5 illustrates block generation on a tiled frame according to an embodiment of the present disclosure.

Referring to FIG. 5, through the image tiling process, pixels at the same location in all frames belonging to one GOF may be merged into one block on the tiled frame.

For example, 32 pixels located at the same point in 32 frames with 256×H resolution may be merged/rearranged into 1 block on 1 tiled frame with 1024×8H resolution.

As pixels located at the same point are merged into one block, one tiled frame may have high spatial correlation.

Next, a method for adaptively determining the block packing order in the image tiling process will be described through detailed examples.

Figure 6:
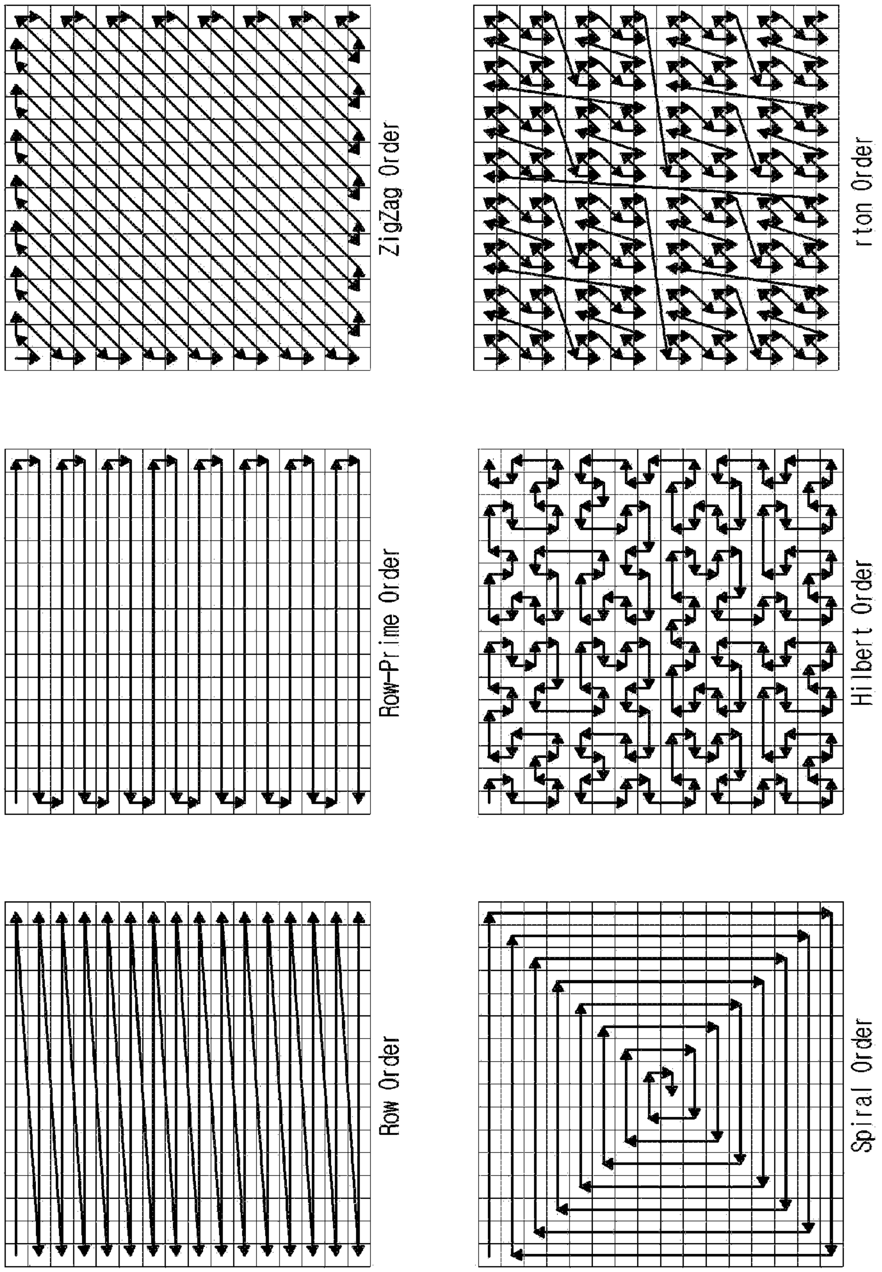
FIG. 6 illustrates a block packing order for image tiling according to an embodiment of the present disclosure.

FIG. 6 illustrates a block packing order for image tiling according to an embodiment of the present disclosure.

Referring to FIG. 6, when pixels of frames belonging to a GOF are rearranged into blocks on a tiled frame in the image tiling process, various block packing orders may be applied.

Here, the block packing order may refer to the order of arranging pixels to generate a block.

For example, in order to generate/rearrange blocks on a tiled frame, various block packing orders such as Row Order, Row-Prime Order, ZigZag Order, Spiral Order, Hilbert Order, Morton Order, or the like may be applied.

In the process of merging a plurality of pixels into one block, the block packing order may be adaptively determined according to 3D data characteristics before conversion, 2D video codec characteristics, etc.

Additionally or alternatively, the same packing order may be applied to all blocks constituting a tiled frame. Alternatively, a different packing order may be applied to each block constituting the tiled frame.

As an example, the packing order of the current block may be determined according to differential quality (Level of Detail, LoD). As another example, the packing order of the current block may be determined according to the correlation between neighboring samples of 3D data.

Regarding the block packing order described above, when there are two or more frames constituting a GOF, pixels at the same location in all frames belonging to the GOF may be merged into one block on a tiled frame.

At this time, the order in which pixels at the same location in each frame are arranged within blocks in the tiled frame may be determined. For example, in the case of a GOF consisting of 32 frames, 32 pixels at the same location may be merged into one block according to the determined packing order.

In contrast, when there is one frame constituting a GOF, pixels in that frame may be rearranged in block units.

Figure 7:
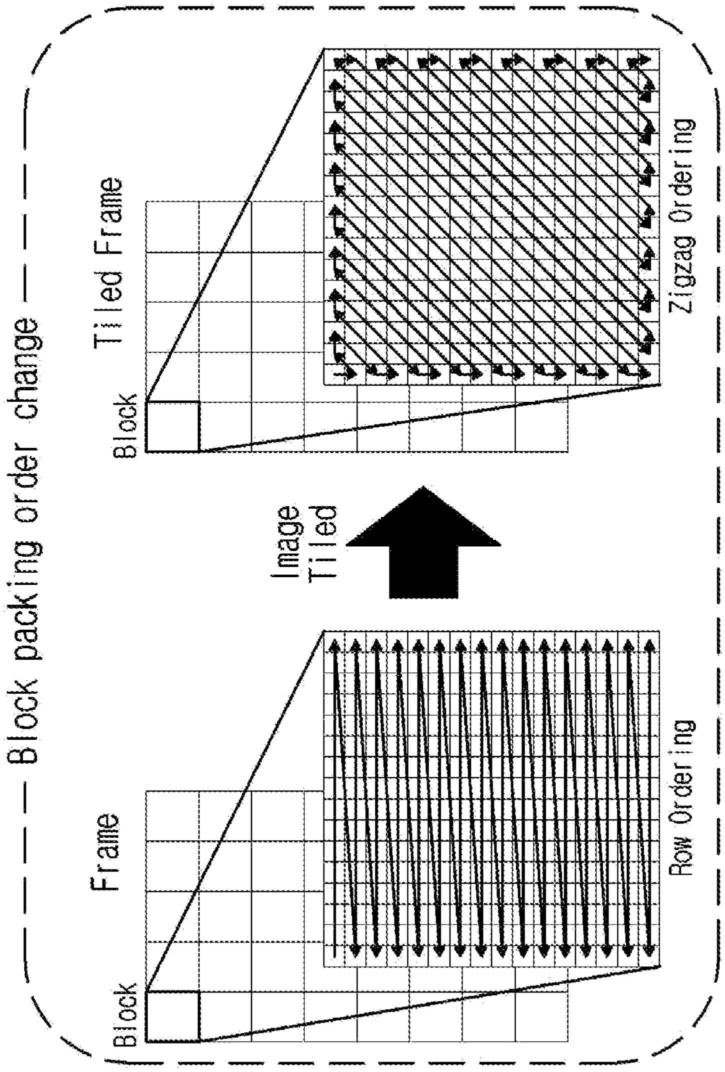
FIG. 7 illustrates a block packing order in a case that GOF is constructed with a single frame according to an embodiment of the present disclosure.

FIG. 7 illustrates a block packing order in a case that GOF is constructed with a single frame according to an embodiment of the present disclosure.

Referring to FIG. 7, an appropriate pixel arrangement order may be derived for each block in a single frame, and pixels within the block may be rearranged based on this.

For example, when creating a tiled frame through an image tiling process, the pixel arrangement order of a single frame 16×16 block may be changed from the Row Ordering method to the ZigZag Ordering method.

Next, a method for adaptively determining the width/height length of a block in the image tiling process will be described through detailed examples.

Figure 8:
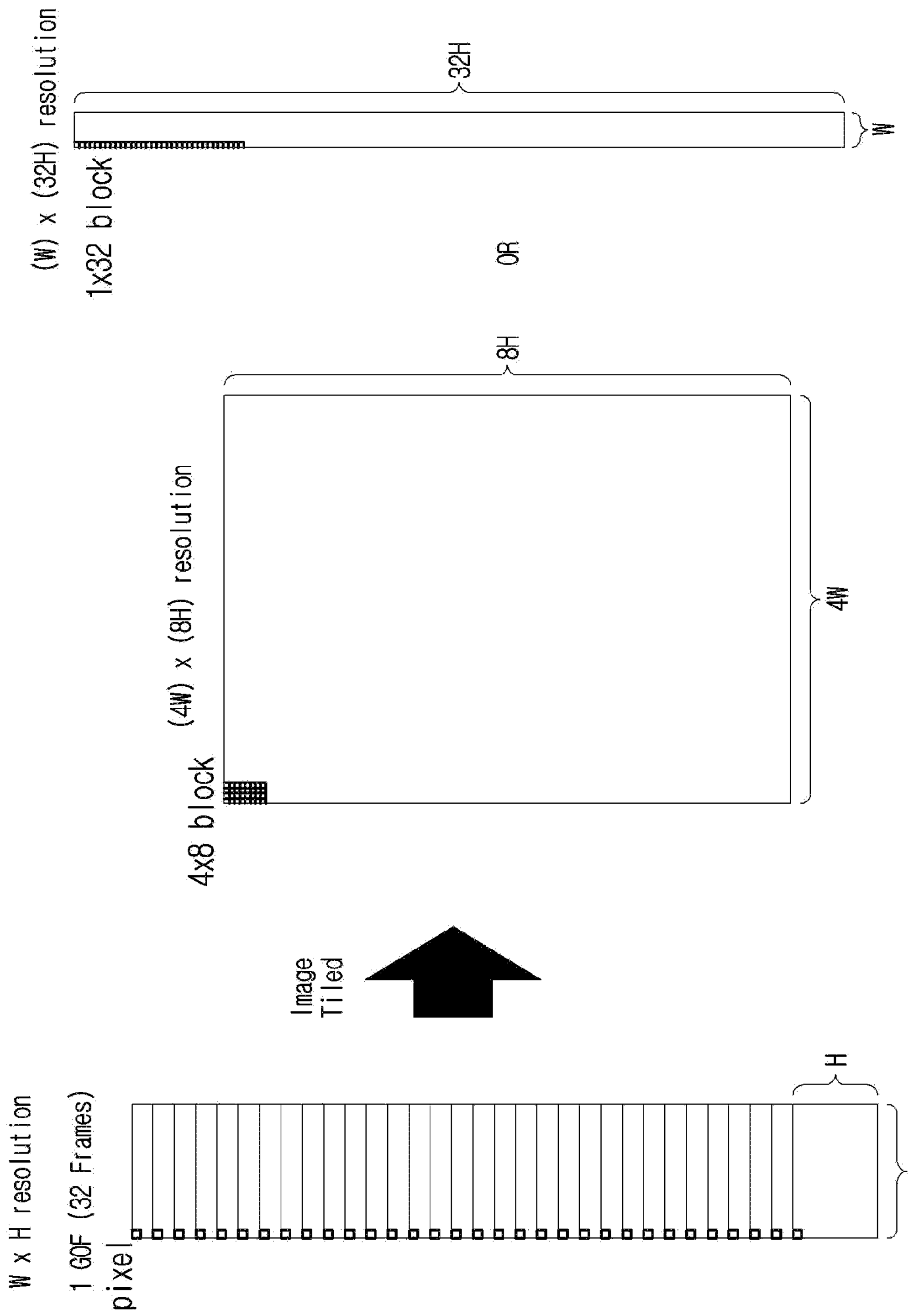
FIG. 8 illustrates various block shapes for image tiling according to an embodiment of the present disclosure.

FIG. 8 illustrates various block shapes for image tiling according to an embodiment of the present disclosure.

In the image tiling process, when pixels of frames belonging to a GOF are rearranged into one block on a tiled frame, various block shapes (i.e., width/height length/ratio of the block) may be applied.

In the process of merging pixels existing at same location into one block, the block shape may be adaptively determined according to 3D data characteristics before conversion, 2D video codec characteristics, etc.

Specifically, the width/height ratio of a block may be determined according to the correlation between neighboring samples of 3D data before conversion and video codec characteristics. If 3D data is divided and processed in specific area units, the 2D block shape may be determined similar to the division shape.

Referring to an example shown in FIG. 8, a GOF consisting of 32 frames with W×H resolution may be converted into a tiled frame with 4 W×8H resolution through image tiling. In this case, 32 pixels existing at the same location may be merged into a 4×8 block.

Referring to another example shown in FIG. 8, a GOF consisting of 32 frames with W×H resolution may be converted into a tiled frame with W×32H resolution through image tiling. In this case, 32 pixels existing at the same location may be merged into a 1×32 block.

As in the corresponding examples, the width/height length of the block may be determined based on the resolution of the converted tiled frame.

Regarding the block type described above, when there are two or more frames constituting a GOF, pixels existing at the same location in all frames belonging to the GOF may be merged into one block in a tiled frame.

At this time, the width/height length of the block in which pixels at the same location in each frame are merged may be adaptively determined.

For example, in the case of a GOF consisting of 32 frames, 32 pixels at the same location for each frame may be arranged in one of block types/shapes such as 1×32 blocks, 2×16 blocks, 4×8 blocks, 8×4 blocks, 16×2 blocks, 32×1 blocks, etc.

In contrast, when there is only one frame constituting the GOF, a method of changing the width/height ratio of the corresponding frame by changing the width/height ratio of the blocks constituting the corresponding frame may be applied.

At this time, an appropriate block width/height ratio may be derived for a single frame, and based on this, the pixels may be rearranged by changing the block division shape/type of the frame.

For example, 4×8 block in a single frame may be reconstructed into one of block types/shapes such as 1×32 block, 2×16 block, 8×4 block, 16×2 block, 32×1 block, etc.

Figure 9:
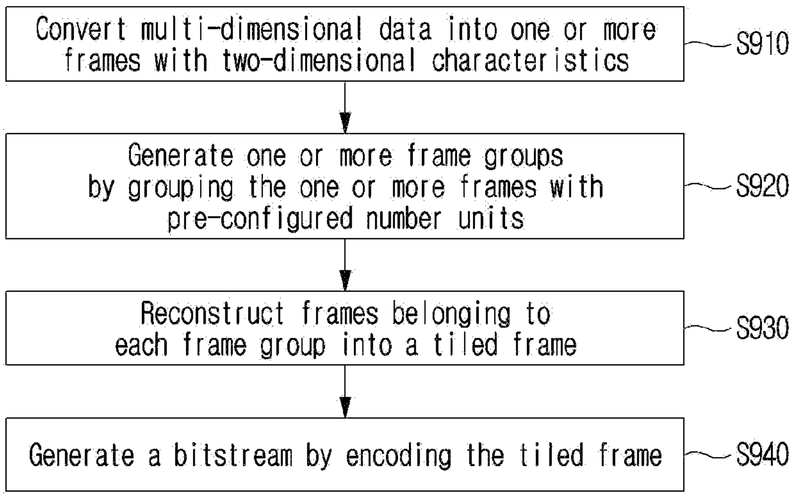
FIG. 9 illustrates an operation flowchart of a method for encoding multi-dimensional data according to an embodiment of the present disclosure.

FIG. 9 illustrates an operation flowchart of a method for encoding multi-dimensional data according to an embodiment of the present disclosure.

The operations described in FIG. 9 are based on 1) a method for merging one or more frames in GOF units, 2) a method for adaptively determining the block packing order, and 3) a method for adaptively determining the block width/height length described above in the present disclosure.

In step S910, an encoder may convert multi-dimensional data into a plurality of frames with two-dimensional characteristics.

For example, multi-dimensional data may correspond to 3-dimensional domain data, and a plurality of frames may correspond to 2-dimensional domain data.

In step S920, the encoder may generate one or more frame groups by grouping the plurality of frames with pre-configured number (e.g., predetermined/set/specified number, automatically set number adaptive to system environment (e.g., adaptive to hardware and transmission environment), etc.) units.

For example, one or more frame groups may correspond to the GOF described above in the present disclosure.

In step S930, the encoder may reconstruct the frames belonging to each frame group into tiled frames.

Here, the tiled frame may be constructed with one or more blocks, and each block may be constructed by rearranging pixels existing at the same location in the frames.

In this regard, the frames may correspond to neighboring frames during a certain period in display order or decoding order.

In this regard, the resolution of the tiled frame may be set higher than or equal to the resolution of each of the one or more frames.

In this regard, as described above in the present disclosure, the rearrangement order of the pixels may be determined based on the characteristics of the multi-dimensional data, characteristics of the codec for encoding, etc. At this time, the rearrangement order of the pixels may be applied equally to the one or more blocks, or may be applied differently for each block, based on a specific criterion.

Additionally or alternatively, the width and height lengths of each of the one or more blocks may be determined based on characteristics of the multi-dimensional data, characteristics of the codec for encoding, etc. At this time, the width and height lengths of each of the one or more blocks may be related to the resolution of the tiled frame.

In step S940, the encoder may generate a bitstream by encoding the tiled frame.

Additionally or alternatively, based on at least one of information on a multi-dimensional domain, information on transformation to a two-dimensional domain, or content information, it may be determined whether to perform reconstruction of the tiled frame.

Additionally or alternatively, an operation of storing or (explicitly/implicitly) transmitting information on the frame group and information on the one or more blocks may be performed. Here, the information on the one or more blocks may include information on the rearrangement order of the pixels, information on the width and height lengths of each of the one or more blocks, etc.

Figure 10:
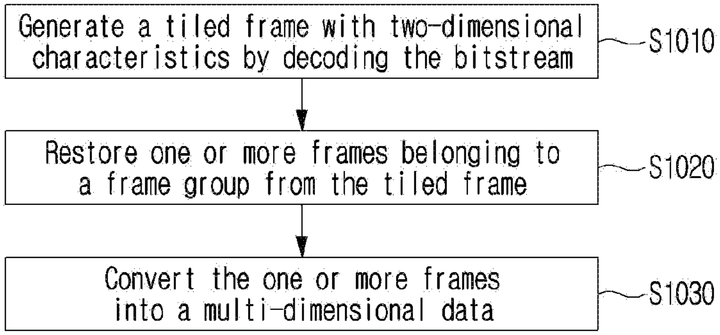
FIG. 10 illustrates an operation flowchart of a method for decoding a bitstream according to an embodiment of the present disclosure.

FIG. 10 illustrates an operation flowchart of a method for decoding a bitstream according to an embodiment of the present disclosure.

The operations described in FIG. 10 are based on 1) a method for merging one or more frames in GOF units, 2) a method for adaptively determining the block packing order, and 3) a method for adaptively determining the block width/height length described above in the present disclosure.

In step S1010, a decoder may decode the bitstream to generate a tiled frame with two-dimensional characteristics.

In step S1020, the decoder may restore one or more frames belonging to a frame group from the tiled frame.

In step S1030, the decoder may convert the one or more frames into multi-dimensional data.

In the example of FIG. 10, detailed descriptions related to tiled frames, frame groups, etc. are the same as those described in the example of FIG. 9, so overlapping descriptions will be omitted.

Figure 11:
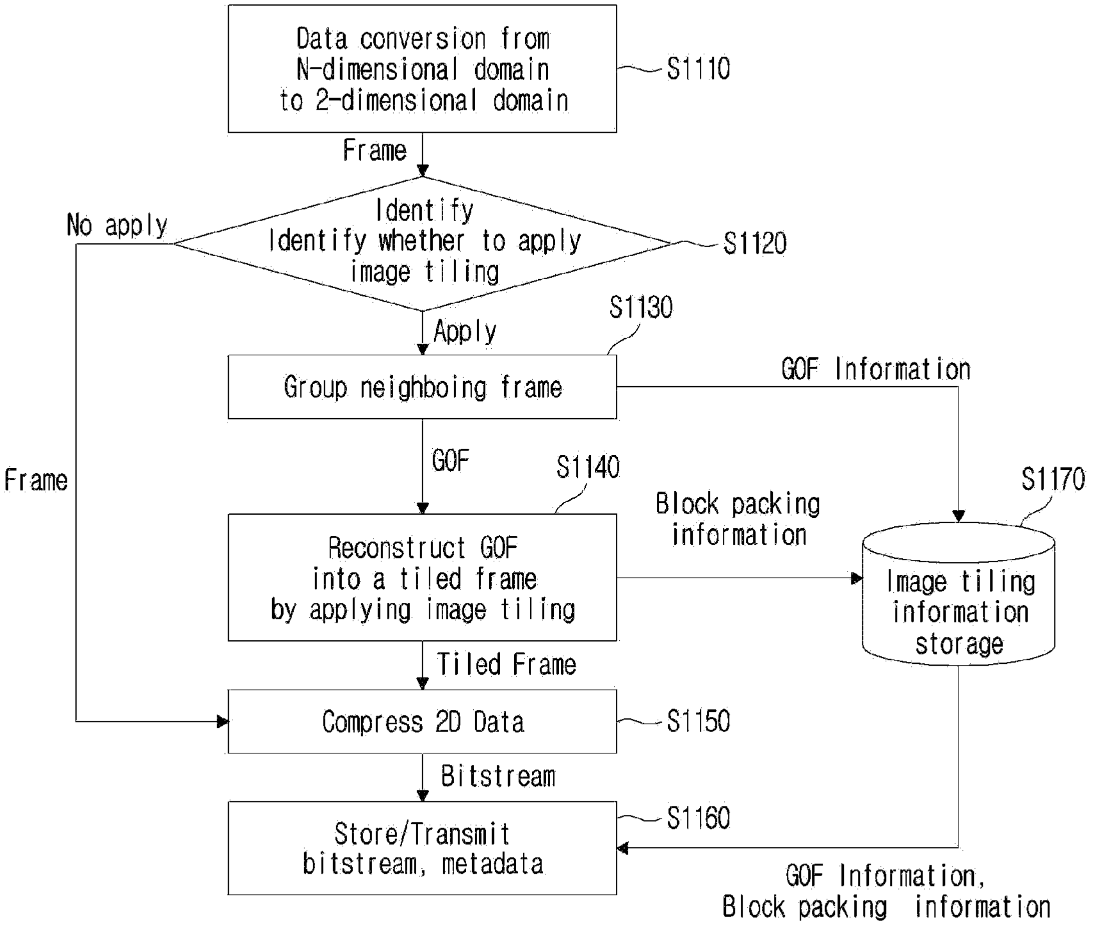
FIG. 11 illustrates a detailed operation flowchart in an image tiling-based encoding method according to an embodiment of the present disclosure.

FIG. 11 illustrates a detailed operation flowchart in an image tiling-based encoding method according to an embodiment of the present disclosure.

The operations described in FIG. 11 are based on 1) a method for merging a plurality of frames in GOF units, 2) a method for adaptively determining the block packing order, and 3) a method for adaptively determining the block width/height length described above in the present disclosure.

In step S1110, data may be converted from an N-dimensional domain to a 2-dimensional domain. That is, N-dimensional domain data may be converted to 2-dimensional domain data (e.g., frame).

Here, N is a positive integer greater than or equal to 1.

In step S1120, it is possible to determine/identify whether to apply the image tiling proposed in the present disclosure.

In this case, whether to apply image tiling may be determined based on N-dimensional domain information, 2-dimensional transformation information, content information, etc.

If it is decided not to apply image tiling, a compression process may be performed on the 2-dimensional data converted in step S1150 as before.

Alternatively, if it is decided to apply image tiling, grouping of neighboring frames may be performed in step S1130. That is, neighboring frames may be grouped/configured to the GOF described above in the present disclosure.

In step S1140, the GOF generated in step S1130 may be reconstructed into a tiled frame by applying image tiling as described above.

In step S1150, the tiled frame may be compressed using a 2D video codec, etc., and a bitstream may be generated through this.

In step S1160, the bitstream and/or metadata related thereto may be stored and/or transmitted.

Additionally, as in step S1170, GOF information related to step S1130, block packing information related to step S1140, etc. may be stored in an image tiling information storage (e.g., database (DB), etc.). Here, the block packing information may include information on the block packing order, information on the block type/shape (e.g., width/height length of the block, size, etc.).

GOF information and/or block packing information as described above may be applied to the operation in step S1160.

Figure 12:
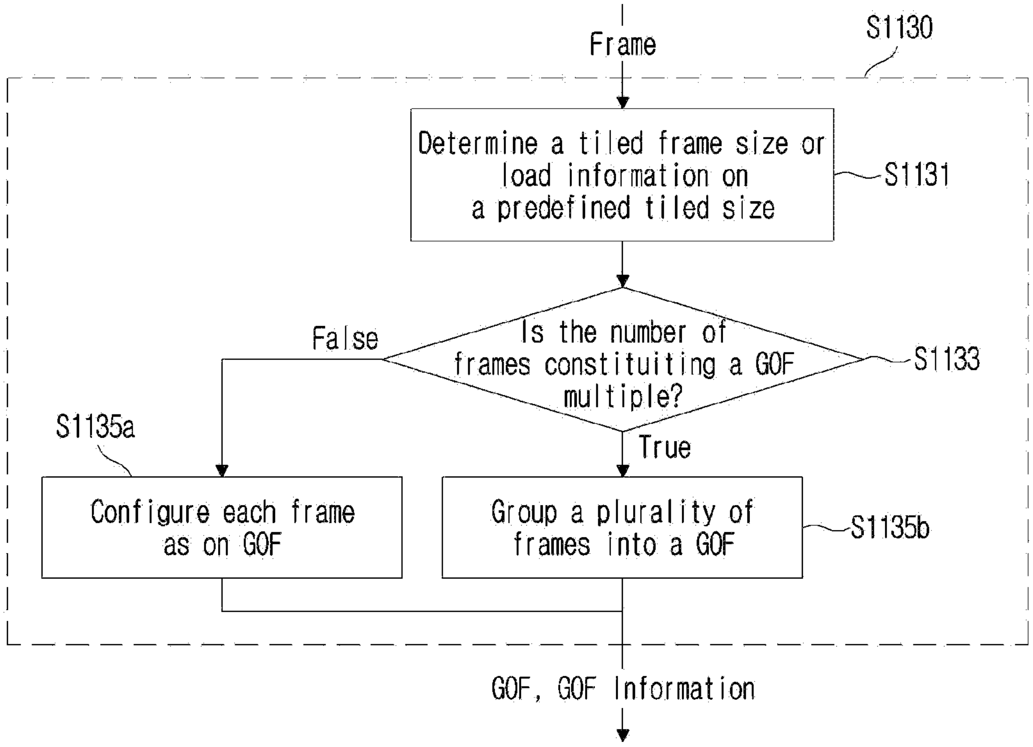
FIG. 12 illustrates a detailed operation flowchart of grouping neighboring frames in an image tiling-based encoding method according to an embodiment of the present disclosure.

FIG. 12 illustrates a detailed operation flowchart of grouping neighboring frames in an image tiling-based encoding method according to an embodiment of the present disclosure.

The process described in FIG. 12 may correspond to details of step S1130 shown in FIG. 11.

In relation to the process of grouping neighboring frames, that is, generating GOF and/or GOF information, in step S1131, the size of the tiled frame may be determined or information on the predefined tiled size may be loaded.

In step S1133, it may be determined whether the number of frames constituting the GOF is multiple.

If the number of frames constituting the GOF is one, each frame may be configured as one GOF in step S1135*a*.

Alternatively, if there are a plurality of frames constituting the GOF, the plurality of frames may be grouped into a GOF in step S1135*b*. That is, the plurality of frames converted to 2D data may be grouped in GOF units.

In the process of FIG. 12, determining the size of the tiled frame may mean, if the size of the current frame is H×W, determining the N and M values of (N*H)×(M*W) or determining the area of the tiled frame.

At this time, the size of the tiled frame may be calculated based on the characteristics of the 2D video codec and the size of the current frame.

Additionally or alternatively, if the Group of Pictures (GOP) for Inter-Prediction is determined through a preceding process (i.e., 3D data preprocessing process, conversion process of 3D data to 2D data, etc.), the corresponding N*M value may be set considering the number of frames constituting the GOP. For example, the N*M value may be set not to exceed the number of frames constituting the GOP (e.g., N*M>Count(GOP)).

Through this process, the number of frames constituting the GOF for image tiling may be automatically determined. That is, the number of frames constituting the GOF may correspond to N*M.

If the size of the tiled frame is determined to be H×W, this may mean that the GOF for image tiling is constructed with one frame.

Figure 13:
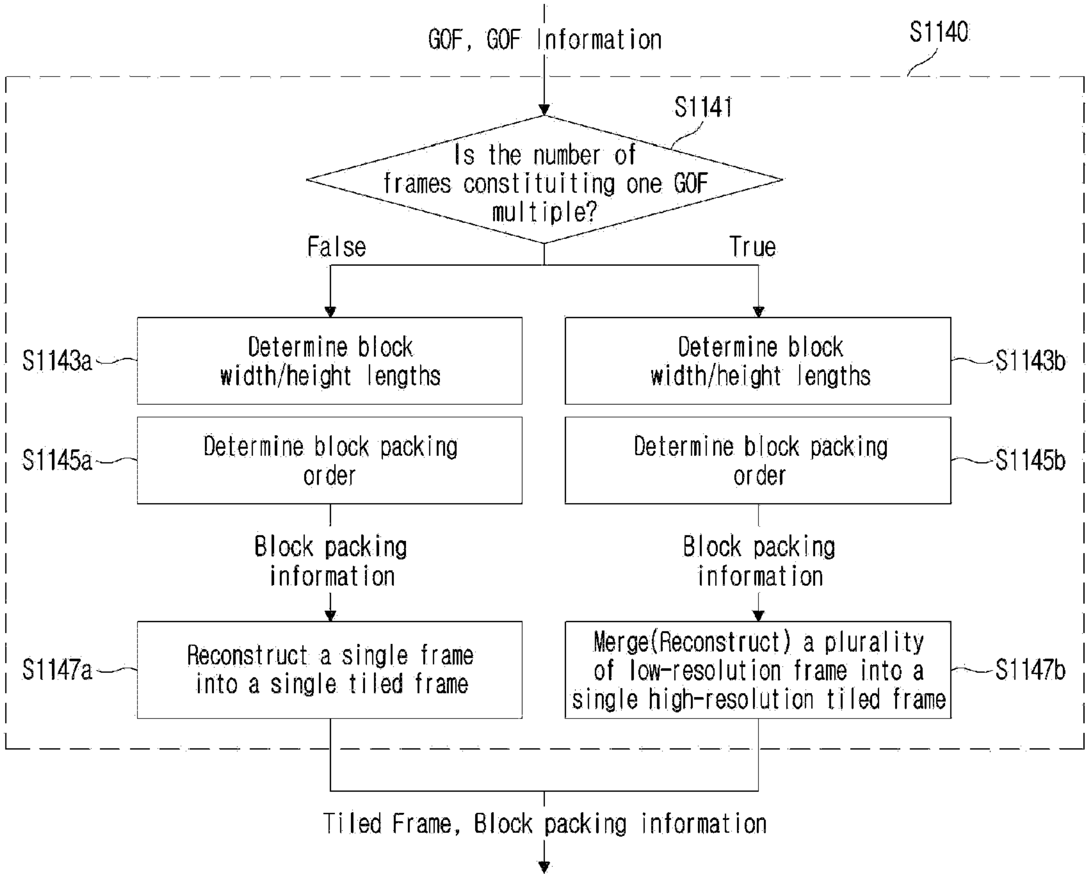
FIG. 13 illustrates a detailed operation flowchart for constructing a tiled frame in an image tiling-based encoding method according to an embodiment of the present disclosure.

FIG. 13 illustrates a detailed operation flowchart for constructing a tiled frame in an image tiling-based encoding method according to an embodiment of the present disclosure.

The process described in FIG. 13 may correspond to details of step S1140 shown in FIG. 11.

Regarding the process of (re)constructing GOF into a tiled frame by applying image tiling, that is, constructing a tiled frame and generating block packing information, in step S1141, it may be determined whether the number of frames constituting one GOF is multiple.

If the number of frames constituting one GOF is one, the width/height length of the block may be determined (S1143*a*) and the packing order of the block may be determined (S1145*a*).

Thereafter, in step S1147*a*, one frame may be reconstructed into one tiled frame.

Specifically, with reference to the width/height information and packing information of the received block, an existing frame may be divided into a plurality of blocks, and a tiled frame may be generated by reconstructing pixels/samples within the blocks.

In contrast, when there are multiple frames constituting one GOF, the width/height length of the block may be determined (S1143*b*) and the packing order of the block may be determined (S1145*b*).

Thereafter, in step S1147*b*, the plurality of low-resolution frames may be merged/reconstructed into one high-resolution tiled frame.

Specifically, a tiled frame may be generated by packing pixels/samples existing at the same location for each frame belonging to the GOF so that they are located within one block on the tiled frame.

Figure 14:
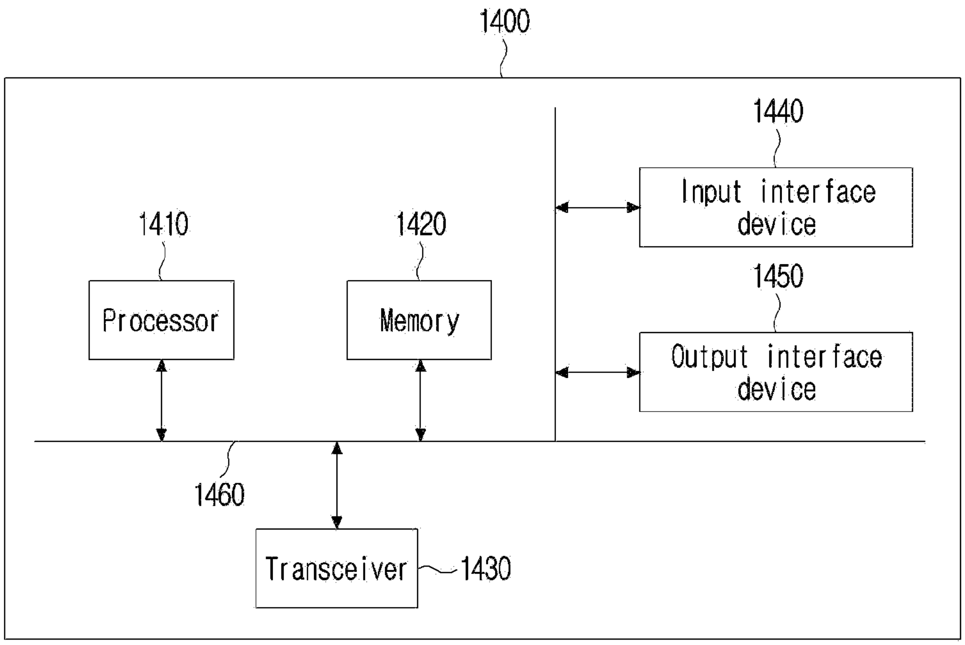
FIG. 14 is a block diagram illustrating a device according to an embodiment of the present disclosure.

FIG. 14 is a block diagram illustrating an apparatus according to an embodiment of the present disclosure.

Referring to FIG. 14, a device 1400 may represent a device in which a method for performing an image tiling described in the present disclosure is implemented.

For example, the device 1400 may generally support/perform the function to merge a plurality of frames in GOF units, the function to adaptively determine block packing order, and, the function to adaptively determine block width/height length, and the like.

The device 1400 may include at least one of a processor 1410, a memory 1420, a transceiver 1430, an input interface device 1440, and an output interface device 1450. Each of the components may be connected by a common bus 1460 to communicate with each other. In addition, each of the components may be connected through a separate interface or a separate bus centering on the processor 1410 instead of the common bus 1460.

The processor 1410 may be implemented in various types such as an application processor (AP), a central processing unit (CPU), a graphic processing unit (GPU), etc., and may be any semiconductor device that executes a command stored in the memory 1420. The processor 1410 may execute a program command stored in the memory 1420. The processor 1410 may be configured to implement a method for generating MPI view plane data and a method for performing an image tiling based on FIGS. 1 to 13 described above.

And/or, the processor 1410 may store a program command for implementing at least one function for the corresponding modules in the memory 1420 and may control the operation described based on FIGS. 1 to 13 to be performed.

The memory 1420 may include various types of volatile or non-volatile storage media. For example, the memory 1420 may include read-only memory (ROM) and random access memory (RAM). In an embodiment of the present disclosure, the memory 1420 may be located inside or outside the processor 1410, and the memory 1420 may be connected to the processor 1410 through various known means.

The transceiver 1430 may perform a function of transmitting and receiving data processed/to be processed by the processor 1410 with an external device and/or an external system.

The input interface device 1440 is configured to provide data to the processor 1410.

The output interface device 1450 is configured to output data from the processor 1410.

According to the present disclosure, a method and apparatus for encoding a displacement video using an image tiling may be provided.

According to the present disclosure, a method and apparatus for performing image tiling to merge and reconstruct one or more frames into one tiled frame to have appropriate resolution and high spatial correlation may be provided.

According to the present disclosure, a method and apparatus for merging a group of frames converted from an N-dimension (ND) domain to a two-dimensional (2D) domain into one tiled frame through an image tiling scheme may be provided.

According to the present disclosure, a method and apparatus for adaptively determining a packing order when merging a plurality of pixels into one block during an image tiling may be provided.

According to the present disclosure, a method and apparatus for adaptively determining the size or width/height ratio of a block when merging a plurality of pixels into one block during an image tiling may be provided.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, it is intended that this disclosure embrace all other substitutions, modifications and variations belong within the scope of the following claims.

What is claimed is:

1. A method for encoding multi-dimensional data, the apparatus comprising:

converting the multi-dimensional data into a plurality of frames with two-dimensional characteristics, the plurality of frames corresponding to different temporal instants of a frame sequence;

grouping the plurality of frames into one or more frame groups, each frame group including a pre-configured number of neighboring frames in display order or decoding order of the frame sequence;

for each group, reconstructing the frames belonging to the frame group into a single tiled frame; and generate a bitstream by encoding a sequence including the single tiled frame for each frame group, wherein each tiled frame is constructed with a plurality of blocks, wherein each block is formed in the tiled frame by rearranging samples located at a same spatial position across the frames belonging to the frame group, and wherein the samples forming the block are arranged within the block in an order corresponding to the display order or decoding order of the frames belonging to the frame group.

2. The method of claim 1, wherein the order corresponding to the display order or the decoding order is determined based on at least one of characteristics of the multi-dimensional data or characteristics of a codec for the encoding.

3. The method of claim 2, wherein the order of the samples is applied equally to the plurality of blocks, or is applied differently for each block, based on a specific criterion.

4. The method of claim 1, wherein a width and height lengths of each of the plurality of blocks is determined based on at least one of characteristics of the multi-dimensional data or characteristics of a codec for the encoding.

5. The method of claim 4, wherein the width and height lengths of each of the plurality of blocks is related to a resolution of the tiled frame.

6. The method of claim 1, wherein a resolution of the tiled frame is set higher than or equal to a resolution of each of the plurality of frames.

7. The method of claim 1, further comprising:

determining whether to perform reconstruction of the tiled frame, based on at least one of information on a multi-dimensional domain, information on conversion to a two-dimensional domain, or content information.

8. The method of claim 1, further comprising:

storing or transmitting information on the frame group and information on the plurality of blocks, wherein the information on the plurality of blocks includes information on a rearrangement order of the samples, information on the width and height lengths of each of the plurality of blocks.

9. The method of claim 1, wherein each block is disposed in the single tiled frame at a spatial position corresponding to the spatial position within the frames from which the samples forming the block are obtained.

10. An apparatus for encoding multi-dimensional data, the apparatus comprising:

a processor and a memory, wherein the processor is configured to:

convert the multi-dimensional data into a plurality frames with two-dimensional characteristics, the plurality of frames corresponding to different temporal instants of a frame sequence;

group the plurality of frames into one or more frame groups, each frame group including a pre-configured number of neighboring frames in display order or decoding order of the frame sequence;

for each group, reconstruct the frames belonging to the frame group into a single tiled frame; and generate a bitstream by encoding a sequence including the single tiled frame, wherein the tiled frame is constructed with a plurality of blocks, wherein each block is formed in the tiled frame by rearranging samples located at a same spatial position across each of the frames belonging to the frame group, and wherein the samples forming the block are arranged within the block in an order corresponding to the display order or decoding order of the frames belonging to the frame group.

11. The apparatus of claim 10, wherein the order corresponding to the display order or the decoding order is determined based on at least one of characteristics of the multi-dimensional data or characteristics of a codec for the encoding.

12. The apparatus of claim 11, wherein the order of the samples is applied equally to the plurality of blocks, or is applied differently for each block, based on a specific criterion.

13. The apparatus of claim 10, wherein a width and height lengths of each of the plurality of blocks is determined based on at least one of characteristics of the multi-dimensional data or characteristics of a codec for the encoding.

14. The apparatus of claim 13, wherein the width and height lengths of each of the plurality of blocks is related to a resolution of the tiled frame.

15. The apparatus of claim 10, wherein a resolution of the tiled frame is set higher than or equal to a resolution of each of the plurality of frames.

16. The apparatus of claim 10, wherein the processor is configured to determine whether to perform reconstruction of the tiled frame, based on at least one of information on a multi-dimensional domain, information on conversion to a two-dimensional domain, or content information.

17. The apparatus of claim 10, wherein the processor is configured to store or transmit information on the frame group and information on the plurality of blocks, and wherein the information on the plurality of blocks includes information on a rearrangement order of the samples, information on the width and height lengths of each of the plurality of blocks.

18. The apparatus of claim 10, wherein each block is disposed in the single tiled frame at a spatial position corresponding to the spatial position within the frames from which the samples forming the block are obtained.

19. A method for decoding a bitstream, the method comprising:

decoding the bitstream to obtain a sequence including a single tiled frame for each of one or more frame groups;

for each frame group, restoring a plurality of frames belonging to the frame group from the single tiled frame; and converting the plurality of restored frames into a multi-dimensional data, wherein each frame group includes a pre-configured number of neighboring frames in display order or decoding order, wherein each tiled frame is constructed with a plurality of blocks, wherein each block includes samples located at a same spatial position across the frames belonging to the frame group, and wherein the samples included in each block are arranged in an order corresponding to the display order or decoding order of the frames belonging to the frame group.

20. One or more non-transitory computer readable medium storing one or more instructions, wherein the one or more instructions are executed by one or more processors and control an apparatus for encoding multi-dimensional data to:

convert the multi-dimensional data into a plurality of frames with two-dimensional characteristics, the plurality of frames corresponding to different temporal instants of a frame sequence;

group the plurality of frames into one or more frame groups, each frame group including a pre-configured number of neighboring frames in display order or decoding order of the frame sequence;

for each frame group, reconstruct the frames belonging to the frame group into a single tiled frame; and generate a bitstream by encoding a sequence including the single tiled frame, wherein each tiled frame is constructed with a plurality of blocks, and wherein each block is formed in the tiled frame by rearranging samples located at a same spatial position across the frames belonging to the frame group, and wherein the samples forming the block are arranged within the block in an order corresponding to the display order or decoding order of the frames belonging to the frame group.

* * * * *